United States Patent
Keller et al.

(10) Patent No.: US 11,993,286 B2
(45) Date of Patent: May 28, 2024

(54) VEHICLE AND METHOD FOR DETECTING DAMAGE TO A VEHICLE

(71) Applicants: Daimler AG, Stuttgart (DE); Robert Bosch GmbH, Stuttgart (DE)

(72) Inventors: Christoph Gustav Keller, Stuttgart (DE); Holger Mielenz, Ostfildern (DE)

(73) Assignee: Daimler AG, Stuttgart (DE)

( * ) Notice: Subject to any disclaimer, the term of this patent is extended or adjusted under 35 U.S.C. 154(b) by 259 days.

(21) Appl. No.: 17/601,965

(22) PCT Filed: Apr. 8, 2020

(86) PCT No.: PCT/EP2020/059977
§ 371 (c)(1),
(2) Date: Oct. 7, 2021

(87) PCT Pub. No.: WO2020/208059
PCT Pub. Date: Oct. 15, 2020

(65) Prior Publication Data
US 2022/0204049 A1   Jun. 30, 2022

(30) Foreign Application Priority Data
Apr. 11, 2019 (DE) ............ 10 2019 109 564.6

(51) Int. Cl.
*B60W 60/00* (2020.01)
*B60H 1/00* (2006.01)
(Continued)

(52) U.S. Cl.
CPC ... *B60W 60/00186* (2020.02); *B60H 1/00735* (2013.01); *B60W 10/30* (2013.01); *B60W 40/12* (2013.01); *B60W 2556/45* (2020.02)

(58) Field of Classification Search
CPC ........... B60W 60/00186; B60W 10/30; B60W 40/12; B60W 2556/45; B60W 2420/10; B60W 30/182; B60H 1/00735
See application file for complete search history.

(56) References Cited

U.S. PATENT DOCUMENTS

2017/0028837 A1   2/2017  Welschoff
2018/0304836 A1  10/2018  DeCia et al.

FOREIGN PATENT DOCUMENTS

CN   201965713 U  *  9/2011
CN   108222716 A     6/2018
(Continued)

OTHER PUBLICATIONS

English translation of CN-201965713-U (Year: 2011).*
(Continued)

*Primary Examiner* — Shon G Foley
(74) *Attorney, Agent, or Firm* — Marshall & Melhorn, LLC

(57) ABSTRACT

A vehicle designed for an automated driving operation may have a ventilation device for ventilating a vehicle interior. A control unit and at least one pressure sensor assembly may be provided. The control unit may be designed to activate the ventilation device and to determine a setpoint pressure value of the air pressure within the vehicle interior while the vehicle interior is closed, to infer damage to a vehicle shell surrounding the vehicle interior. Further, the control unit may block the automated driving operation if it is inferred that there is damage to the vehicle shell. Methods for detecting damage to the vehicle and for operating a vehicle are also provided. A device for carrying out a method for detecting damage to a vehicle and/or for carrying out a method for operating a vehicle to a computer program and to a machine-readable storage medium are also provided.

12 Claims, 1 Drawing Sheet

(51) Int. Cl.
*B60W 10/30* (2006.01)
*B60W 40/12* (2012.01)

(56) References Cited

FOREIGN PATENT DOCUMENTS

| DE | 10116820 A1 | 1/2003 |
|---|---|---|
| DE | 102013012418 A1 | 4/2014 |
| DE | 102013218299 A1 | 3/2015 |
| DE | 102016011926 A1 | 6/2017 |
| DE | 102016014028 A1 | 5/2018 |
| EP | 2660085 A1 | 11/2013 |
| EP | 2723621 B1 | 8/2015 |
| KR | 101549965 B1 * | 9/2015 |
| KR | 101797069 B1 | 11/2017 |

OTHER PUBLICATIONS

English translation of KR-101549965-B1 (Year: 2015).*
R. K. Jurgen, "The Electronic Motorist," in IEEE Spectrum, vol. 32, No. 3, pp. 37-48, Mar. 1995, doi: 10.1109/6.367971.
European Patent Office, International Search Report and Written Opinion in Application No. PCT/EP2020/059977, dated Aug. 7, 2020, 11 pages, Rijswijk, Netherlands.
Hao-Min Huang et al., College of Mechanical Engineering, Guiyang University, Vehicle Window Control Method Base on Matlab, Auto Electric Parts, No. 11, pp. 74-76, Nov. 2017.
China National Intellectual Property Administration, Office Action in Application No. CN202080015054.9, dated Oct. 14, 2023, 13 pages.

* cited by examiner

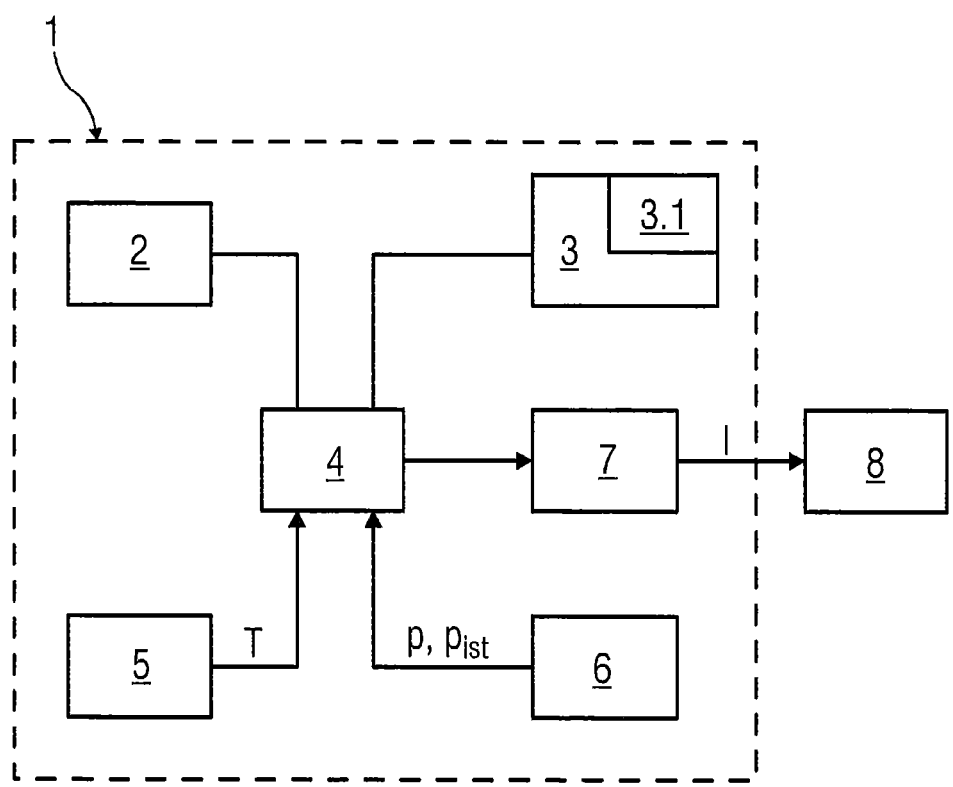

VEHICLE AND METHOD FOR DETECTING DAMAGE TO A VEHICLE

FIELD

The invention relates to a vehicle according to the claims.

The invention further relates to a method for detecting damage to a vehicle.

The invention further relates to a method for operating a vehicle according to the claims.

The invention further relates to a device for performing a method for detecting damage to a vehicle and/or for performing a method for operating a vehicle, to a computer program, and to a machine-readable storage medium.

BACKGROUND

Vehicles known in general from the prior art are designed for driverless driving operations and automated, particularly highly automated driving operations. Such vehicles comprise a ventilation device for ventilating and controlling the temperature of a vehicle interior.

A method for checking the leak tightness against water entry of an interior space of a vehicle and a space bounded by walls of a component of the vehicle is known from DE 10 2013 012 418 A1. A medium is introduced into the interior space and into the space and the medium escaping from the interior space and from the space is used for detecting a leak of the vehicle and of the component.

A device and a method for actively controlling the interior vehicle pressure in a railway vehicle is further known from EP 2 723 621 B1. The device comprises a ventilation device for increasing the interior pressure in the railway vehicle, an exhaust device for lowering the interior pressure in the railway vehicle, a measuring device for measuring the interior pressure in the railway vehicle, and a control device connected for communicating with the exhaust device for lowering the interior pressure and with the measuring device. Exclusively the exhaust device for reducing the interior pressure is thereby controlled by the control unit as a function of the interior pressure determined by the measuring device, and the measuring device measures the interior pressure at intervals of at least days.

SUMMARY

The object of the invention is to disclose a vehicle improved relative to the prior art, a novel method for detecting damage to a vehicle, and a novel method for operating a vehicle. A further object of the invention is to disclose a device for performing a method for detecting damage to a vehicle and/or for performing a method for operating a vehicle, a computer program, and a machine-readable storage medium.

Advantageous embodiments of the invention are the subject-matter of the subclaims.

A vehicle designed for automated, particularly highly automated, driving operations comprises a ventilation device for actively ventilating an interior of the vehicle.

According to the invention, the vehicle comprises a control unit and at least one pressure sensor assembly, the control unit being designed for activating the ventilation device and for determining a setpoint pressure value of the air pressure arising within the vehicle interior while the vehicle interior is closed. The control unit is further designed for inferring damage to a vehicle shell enclosing the vehicle interior when a specified deviation of a measured pressure value from the setpoint pressure value occurs by a specified amount and for blocking the automated driving operation when it is inferred that there is damage to the vehicle shell.

A vehicle shell is understood here to mean a part of a vehicle enclosing the vehicle interior and bounding the same from the surrounding area. Included herein are components of a vehicle body, windowpanes, and a cloth roof for a cabriolet.

Such a vehicle design enables rapid and reliable detecting of damage to the vehicle shell, for example damage to a windowpane, without requiring extensive hardware and software. Automated operation of a damaged vehicle can be prevented as a result.

In one potential embodiment of the vehicle, said vehicle comprises at least one temperature sensor arrangement for detecting an air temperature present in the vehicle interior and/or an air temperature present outside of the vehicle interior. The control unit is thereby implemented for additionally determining the setpoint pressure value of the air pressure as a function of the air temperature present in the vehicle interior and/or of the air temperature present outside of the vehicle interior. A precision of the determining and therefore a reliability of the detecting of the damage to the vehicle shell can thereby be increased.

In a further potential embodiment of the vehicle, said vehicle comprises a forced-air ventilation system having at least one closable ventilation opening for passively ventilating the vehicle interior. Closing the at least one ventilation opening prior to activating the ventilation device enables particularly precise and reliable detecting of damage to the vehicle shell, as it can be particularly easily checked whether the measured pressure value deviates from a saved setpoint value for an at least nearly airtight, closed vehicle interior. A risk of falsely detecting damage can thereby be significantly reduced.

In a further potential embodiment of the vehicle, said vehicle comprises a communications unit designed for transmitting information relating to the damage to the vehicle shell to a central processing unit external to the vehicle. Said transmitting enables informing a vehicle user, a vehicle operator, or a service point in a timely manner that the vehicle is damaged. It is therefore possible to order and perform a repair of the damage very quickly.

According to a method for detecting damage to a vehicle, according to the invention a ventilation device is activated for actively ventilating a vehicle interior. A setpoint pressure value for an air pressure arising within the vehicle interior when said vehicle interior is closed is further determined as a function of an amount of air fed into the vehicle interior by means of the ventilation device. It is further determined whether a deviation is present between the measured pressure value and the setpoint pressure value, wherein when a specified amount of deviation is exceeded, damage to a vehicle shell enclosing the vehicle interior is inferred.

The method enables rapid and reliable detecting of damage to the vehicle shell, for example damage to a windowpane, without requiring extensive hardware and software.

In one potential embodiment of the method, the setpoint pressure value of the air pressure is determined as a function of the air temperature present in the vehicle interior and/or of the air temperature present outside of the vehicle interior. A precision of the determining and therefore a reliability of the method can thereby be increased.

In a further potential embodiment of the method, at least one ventilation opening of a forced air ventilation device implemented for passively ventilating the vehicle interior is closed off prior to activating the ventilation device. Closing the at least one ventilation opening prior to activating the ventilation device enables particularly precise and reliable detecting of damage to the vehicle shell, as it can be particularly easily checked whether the measured pressure value and/or the measured temperature value deviate from saved setpoint values for an at least nearly airtight, closed vehicle interior. A risk of falsely detecting damage can thereby be significantly reduced.

In a further potential embodiment of the method, a type of the damage is determined by comparing the determined deviation to a plurality of specified values of the deviation and saved potential damage types associated with the same. For example, a size of a damage site can be determined from the deviation. If a size of a windowpane of the vehicle is known, then it can be inferred which windowpane of the vehicle has been damaged or destroyed.

According to a method for operating a vehicle, implemented as an automated, particularly highly automated driving operation, when an order for performing automated travel of the vehicle is received, a ventilation device implemented for actively ventilating a vehicle interior is activated. A setpoint pressure value for an air pressure arising within the vehicle interior when said vehicle interior is closed is further determined as a function of an amount of air fed into the vehicle interior by means of the ventilation device. It is further determined whether a deviation is present between the measured pressure value and the setpoint pressure value and/or between the measured temperature value and a specified setpoint temperature, wherein when a specified amount of deviation is exceeded, damage to a vehicle shell enclosing the vehicle interior is inferred, and when damage to the vehicle shell is inferred, automated driving operation is blocked.

The method enables rapid and reliable detecting of damage to the vehicle shell, for example damage to a windowpane, without requiring extensive hardware and software. Automated operation of a damaged vehicle can be prevented as a result.

In a potential embodiment of the method, at least one ventilation opening of a forced air ventilation device implemented for passively ventilating the vehicle interior is closed off prior to activating the ventilation device. Closing the at least one ventilation opening prior to activating the ventilation device enables particularly precise and reliable detecting of damage to the vehicle shell, as it can be particularly easily checked whether the measured pressure value deviates from a saved setpoint value for an at least nearly airtight, closed vehicle interior. A risk of falsely detecting damage can thereby be significantly reduced. In a further potential embodiment of the method, a type of the damage is determined by comparing the determined deviation to a plurality of specified values of the deviation and saved potential damage types associated with the same. For example, a size of a damage site can be determined from the deviation. If a size of a windowpane of the vehicle is known, then it can be inferred which windowpane of the vehicle has been damaged or destroyed.

In a further potential embodiment of the method, when it is inferred that the vehicle shell has been damaged, information relating to the damage to the vehicle shell is transmitted to a central processing unit external to the vehicle.

Said transmitting enables informing a vehicle user, a vehicle operator, or a service point in a timely manner that the vehicle is damaged. It is therefore possible to order and perform a repair of the damage very quickly.

A device is further disclosed being implemented for performing the previously described method for detecting damage to a vehicle and/or the previously described method for operating a vehicle and/or embodiments of the same.

The device is implemented as a control device in one potential embodiment.

A computer program is further disclosed, comprising commands causing the previously described method for detecting damage to a vehicle and/or the previously described method for operating a vehicle and/or embodiments of the same when executing the computer program on a computer.

A machine-readable memory medium on which the previously indicated computer program is saved is further disclosed.

DESCRIPTION OF THE FIGURE

Embodiment examples of the invention are explained in greater detail below using a drawing.

Shown are:

FIG. 1 a schematic block circuit diagram of a vehicle.

DETAILED DESCRIPTION

The single FIG. 1 shows a block circuit diagram of a potential embodiment example of a vehicle 1.

The vehicle 1 is designed for automated, particularly highly automated, driving operations and comprises a ventilation device 2 for actively ventilating an interior of the vehicle. The vehicle 1 further comprises a forced-air ventilation system 3 having at least one closable ventilation opening 3.1 for passively ventilating the vehicle interior. The vehicle 1 further comprises a control unit 4, a temperature sensor assembly 5, a pressure sensor assembly 6, and a communication unit 7.

The temperature sensor assembly 5 is implemented for capturing a temperature in the vehicle interior or in the immediate surrounding area of the vehicle 1. The pressure sensor assembly 6 is implemented for capturing an air pressure in the vehicle interior or in the immediate surrounding area of the vehicle 1.

When the vehicle 1 receives a driving order for automated driving, the control unit 4 first closes the at least one ventilation opening 3.1 of the forced air ventilation device 3. A temperature value T in the vehicle interior and optionally in the surrounding area of the vehicle is further detected by means of the temperature sensor assembly 5, and a pressure value p of the air pressure is detected by means of the pressure sensor assembly 6 and transmitted to the control unit 4.

In addition, air is fed into the vehicle interior by means of the active ventilation device 2 and the air pressure within the same is thus increased. The control unit 4 uses the amount of air fed into the vehicle interior by means of the ventilation device 2, the transmitted pressure value p, and the transmitted temperature value T to determine an expected setpoint pressure value of the air pressure arising within the vehicle interior when the vehicle interior is closed off.

Furthermore, a current measured pressure value $p_{est}$ within the vehicle interior is captured by means of the pressure sensor assembly 6 and also transmitted to the control unit 4. Said unit determines whether a deviation is present between the measured pressure value $p_{Ist}$ and the expected setpoint pressure value.

If a deviation is present and if said deviation exceeds a specified amount, then the control unit 4 infers damage to a vehicle shell enclosing the vehicle interior, for example a damaged windowpane, and blocks automated driving operation.

In one potential embodiment, a plurality of potential amounts of the deviation are saved together with potential types of damage in the control unit 4, wherein the control unit 4 determines a type of damage by comparing the determined deviation to the plurality of specified amounts of the deviation.

It is further provided that the communications unit 7 is designed for transmitting information I relating to the damage to the vehicle shell to a central processing unit 8 external to the vehicle, such as a so-called backend server. The processing unit 8 external to the vehicle can then block the vehicle 1 from accepting driving tasks to be performed in a driverless manner, and/or can inform service personnel to assess and/or correct the damage and/or to secure the vehicle 1.

LIST OF REFERENCE INDICATORS

1 Vehicle
2 Ventilation device
3 Forced air ventilation device
3.1 Ventilation opening
4 Control unit
5 Temperature sensor assembly
6 Pressure sensor assembly
7 Communication unit
8 Processing unit
I Information
p Pressure value
$p_{Ist}$ Measured pressure value
T Temperature value

What is claimed is:

1. A vehicle designed for automated driving operations, comprising:
   a ventilation device for actively ventilating an interior of the vehicle,
   wherein said ventilation device comprises a control unit and at least one pressure sensor assembly,
   wherein the control unit is designed for
      activating the ventilation device and determining a setpoint pressure value for an air pressure arising within the vehicle interior when said vehicle interior is closed,
      inferring damage to a vehicle shell enclosing the vehicle interior when a specified deviation of a measured pressure value determined by means of the pressure sensor assembly from the setpoint pressure value occurs by a specified amount, and
      blocking the automated driving operation when it is inferred that there is damage to the vehicle shell.

2. The vehicle according to claim 1, further comprising a forced-air ventilation system having at least one closable ventilation opening and designed for passively ventilating the vehicle interior.

3. The vehicle according to claim 1, further comprising a communications unit designed for transmitting information relating to the damage to the vehicle shell to a central processing unit external to the vehicle.

4. A method for detecting damage to a vehicle, comprising:
   activating a ventilation device for actively ventilating a vehicle interior,
   activating a pressure sensor assembly for determining a setpoint pressure value for an air pressure arising within the vehicle interior, when said vehicle interior is closed, as a function of an amount of air fed into the vehicle interior via the ventilation device,
   measuring the pressure value of the interior of the vehicle with the pressure sensor assembly,
   determining using a control unit whether a deviation is present between the measured pressure value and the setpoint pressure value,
   when a specified amount of deviation is exceeded, automatically inferring damage to a vehicle shell enclosing the vehicle interior using the control unit; and
   blocking the automatic driving operation when it is inferred that there is damage to the vehicle shell.

5. The method according to claim 4, further comprising at least one ventilation opening of a forced air ventilation device implemented for passively ventilating the vehicle interior is closed off prior to activating the ventilation device.

6. The method according to claim 4, further comprising a type of the damage is determined by comparing the determined deviation to a plurality of specified values of the deviation and saved potential damage types associated with the same.

7. The method according to claim 4, further comprising providing a non-transitory machine-readable storage medium on which a computer program is stored,
   the computer program comprising commands for causing a computer to perform the method according to claim 4 when the computer program is executed on the computer.

8. A method for operating a vehicle implemented in an automated driving operation, comprising:
   upon receipt of an order for performing automated travel of the vehicle, the following steps occur:
      activating a ventilation device for actively ventilating a vehicle interior,
      determining a setpoint pressure value for an air pressure arising within the vehicle interior, when said vehicle interior is closed, as a function of an amount of air fed into the vehicle interior via the ventilation device,
      measuring the pressure value of the interior of the vehicle with a pressure sensor assembly,
      it is determined whether a deviation is present between the measured pressure value and the setpoint pressure value,
      when a specified amount of deviation is exceeded, inferring damage to a vehicle shell enclosing the vehicle interior, and
      the automated driving operation is blocked when it is inferred that there is damage to the vehicle shell.

9. The method according to claim 8, further comprising at least one ventilation opening of a forced air ventilation device implemented for passively ventilating the vehicle interior is closed off prior to activating the ventilation device.

10. The method according to claim 8, further comprising a type of the damage is determined by comparing the determined deviation to a plurality of specified values of the deviation and saved potential damage types associated with the same.

11. The method according to claim 8, wherein when it is inferred that the vehicle shell has been damaged, information relating to the damage to the vehicle shell is transmitted to a central processing unit external to the vehicle.

12. The method according to claim 8, further comprising providing a non-transitory machine-readable storage medium on which the computer program is stored, the computer program comprising commands for causing a computer to perform the method according to claim 8 when the computer program is executed on the computer.

\* \* \* \* \*